(12) United States Patent
Spurr et al.

(10) Patent No.: US 8,726,793 B2
(45) Date of Patent: May 20, 2014

(54) APPARATUS AND METHOD IN THE MANUFACTURE OF LOW OIL POTATO CHIPS

(75) Inventors: Michael Alfred James Spurr, Leicester (GB); Brian Richard Newberry, Leicester (GB); Barbara Louise Warburg, Warwickshire (GB); Lindsay Anne Dobson, Oxfordshire (GB); Paul Fredrick Tomlinson, Leicestershire (GB); Glynn R Bartlett, Boerne, TX (US)

(73) Assignee: Frito-Lay Trading Company GmbH, Berne (CH)

( * ) Notice: Subject to any disclaimer, the term of this patent is extended or adjusted under 35 U.S.C. 154(b) by 0 days.

(21) Appl. No.: 13/982,466

(22) PCT Filed: Jan. 27, 2012

(86) PCT No.: PCT/EP2012/051344
§ 371 (c)(1),
(2), (4) Date: Oct. 9, 2013

(87) PCT Pub. No.: WO2012/104214
PCT Pub. Date: Aug. 9, 2012

(65) Prior Publication Data
US 2014/0030405 A1  Jan. 30, 2014

(30) Foreign Application Priority Data

Jan. 31, 2011 (GB) .................................. 1101604.5

(51) Int. Cl.
*A47J 37/12* (2006.01)
*A23L 1/01* (2006.01)

(52) U.S. Cl.
USPC .................. 99/404; 99/407; 99/409; 426/438

(58) Field of Classification Search
USPC ...................... 99/403–410; 426/438, 510, 523
See application file for complete search history.

(56) References Cited

U.S. PATENT DOCUMENTS 2,041,175 A * 5/1936 Goodman ....................... 99/405
3,641,924 A   2/1972 Sijbring (Continued)

FOREIGN PATENT DOCUMENTS

| GB | 2170396 | 8/1986 |
|---|---|---|
| JP | 62262954 | 5/1986 |
| JP | 2009061206 | 9/2007 |

OTHER PUBLICATIONS

EP Search and Examination Report dated Jun. 1, 2011, 7 pages.

*Primary Examiner* — Dana Ross
*Assistant Examiner* — Lindsey C Teaters
(74) *Attorney, Agent, or Firm* — Shaukat A. Karjeker; Colin P. Cahoon; Carstens & Cahoon, LLP

(57) ABSTRACT

An apparatus for lipophilically conditioning potato slices, the apparatus with an elongate tank for containing a reservoir of oil, the tank having an upstream end and a downstream end, an elongate longitudinal conveyor disposed in the tank, the conveyor being adapted to pass products through the reservoir of oil from the upstream end to the downstream end, the conveyor defining therealong a plurality of compartments for containing respective groups of products during passage from the upstream end to the downstream end, and at least one oil jet located on the tank for causing turbulent flow in the reservoir of oil.

54 Claims, 1 Drawing Sheet

(56) References Cited

U.S. PATENT DOCUMENTS

| | | |
|---|---|---|
| 3,642,495 A | 2/1972 | Davidson et al. |
| 4,234,612 A | 11/1980 | OSakakibara et al. |
| 5,085,137 A | 2/1992 | Mottur et al. |
| 5,133,249 A | 7/1992 | Zittel |
| 5,637,342 A | 6/1997 | Brooks et al. |
| 5,802,961 A * | 9/1998 | Hay et al. ........................ 99/406 |
| 5,858,431 A * | 1/1999 | Wiedersatz ................... 426/242 |
| 2004/0016352 A1 * | 1/2004 | Schottelkotte ................. 99/485 |
| 2008/0026122 A1 | 1/2008 | Bows et al. |
| 2010/0227035 A1 | 9/2010 | Caridis et al. |

* cited by examiner

APPARATUS AND METHOD IN THE MANUFACTURE OF LOW OIL POTATO CHIPS

CROSS-REFERENCE TO RELATED APPLICATIONS

This application is a 371 National Stage Application claiming priority to PCT Application No. PCT/EP2012/051344 filed Jan. 27, 2012, which claims priority to Great Britain Application No. 1101604.5 filed Jan. 31, 2011, now GB Patent No. 2481467 issued Jun. 13, 2012, the technical disclosures of which are hereby incorporated by reference.

BACKGROUND OF THE INVENTION

Technical Field

This invention relates to an apparatus and method for lipophilically conditioning potato slices in the manufacture of low oil potato chips.

It has been known for many years to produce potato chips from slices of potato which are fried in oil, usually vegetable oil. Typical conventional potato chips have an oil content of about 30 to 35 wt % oil, based on the total weight of the potato chip. Potato chips exhibit specific organoleptic properties, in combination with visual appearance, to the consumer. The consumer desirous of purchasing a potato chip has a clear expectation of these product attributes in the product.

There is a general desire among snack food manufacturers, consumers and regulatory authorities for healthier food products. In the snack food industry, this has led to a desire for lower fat products. However, even though there may be a general consumer awareness of the benefits of eating lower fat versions of, or alternatives to, existing snack food products, the consumer generally requires the product to have desirable attributes such as texture and flavour. Even if a snack food product is produced which has high nutritional attributes, unless it also has the texture and flavour required by the consumer, the product would not successfully provide the consumer with an acceptable product to replace previous, less healthy snack food products. The challenge among snack food manufacturers is to produce nutritional or more healthy foods which provide the consumer with an improved taste and sensation experience, or at the very least do not compromise on taste and sensation as compared to the consumer's expectation for the particular product or class of products purchased.

There are in the market so-called lower oil snack food products, including potato chips and other products. Some of these processes are produced by modified frying processes using different frying temperatures than those conventionally employed, or cooking processes other than frying, such as baking. Some of these products produce snack foods with low oil, even as low as 5 wt %, but the snack food product is not regarded by the consumer to be an acceptable alternative to a potato chip, because the product cannot exhibit the organoleptic properties, in combination with the visual appearance, of a potato chip.

WO-A-2008/011489 and WO-A-2009/091674 in the name of Frito-Lay Trading Company GmbH disclose processes for making a healthy snack food. In those processes, a snack food is made so as to have an appearance and taste similar to conventional fried snack products, such as a potato chip. The potato slices are subjected to a sequence of steps which avoids frying of the slices in oil, and the result is a low fat potato chip.

In particular, these specifications disclose the use of microwave cooking of potato slices which have been preconditioned, for example by being treated in oil. Prior to the microwave cooking process, the potato slices are flexible, and have a typical thickness of 1 to 2.5 mm. The microwave cooking rapidly, or explosively, dehydrates the potato slices to achieve low moisture content in a drying step which simulates the conventional frying dehydration rate. The rapid microwave dehydration rigidifies the cooked potato slices, so that they have a crispness resembling that of typical fried potato chips. Additional final drying steps may be employed, for example using microwave drying.

It is disclosed that the oil preconditioning step comprises lipophilic preconditioning by placing the slices into a warm oil flume, a batch kettle or a continuous oil dip. During the lipophilic preconditioning step, a final slice temperature of about 60° C. to about 99.9° C. and a duration of about 30 to 600 seconds may be employed. Subsequent to the lipophilic preconditioning step an oil removal step is employed.

Even though those prior patent specifications disclosed an effective lipophilic pre-conditioning step, there is still a need for an apparatus and method which can reliably provide a very close tolerance lipophilic pre-conditioning step of potato slices in oil when a large mass flow rate of potato slices, as used in large-scale commercial production of potato chips, is required to be treated.

During frying of conventional potato chips in a fryer, in which the potato slices are rapidly dehydrated and cooked in high temperature oil to provide the desired organoleptic properties, as the slices dehydrate the slices float individually to the surface of the oil. In addition to rapidly drying, the potato slices cook and harden, and such rigidification also helps to retain the chips substantially separate in the fryer. However, when lipophilically pre-conditioning the potato slices in oil at a lower temperature which does not cause dehydration of the potato slices, the slices remain dense and they tend to sink in the oil. The slices also do not rigidify but remain flexible. The slices therefore tend to form clumps of slices. Such clumps mean that the slices are not uniformly treated by the oil and they may not be capable of being processed in the later processing steps. Also, the clumps can form blockages in a continuous production line, making processing at a large scale production rate difficult.

There is a need for a lipophilic preconditioning step which can operate continuously at a commercial scale and can avoid the formation of clumps of potato slices which cannot readily be processed. There is a need for a lipophilic preconditioning step which can tend to produce individual single slices which have been lipophilically preconditioned in the oil in a continuous large-scale production apparatus and method.

Furthermore, there is still a general need to provide an oil content during the processing which ensures that the final non-fried potato chip has a lower oil content as compared to conventional fried potato chips yet has a consumer acceptance, provided by the resultant flavour and organoleptic properties, on parity with conventional fried potato chips.

There is accordingly still a need for an apparatus and method for efficiently and reliably manufacturing, in a cost effective manner, a low fat potato chip which has not been fried but has organoleptic properties, in combination with the visual appearance, of a conventional fried potato chip.

SUMMARY OF THE INVENTION

The present invention accordingly provides an apparatus for lipophilically conditioning potato slices, the apparatus comprising an elongate tank for containing a reservoir of oil, the tank having an upstream end and a downstream end, an elongate longitudinal conveyor disposed in the tank, the conveyor being adapted to pass products through the reservoir of oil from the upstream end to the downstream end, the conveyor defining therealong a plurality of compartments for containing respective groups of products during passage from the upstream end to the downstream end, wherein the conveyor comprises a rotatable drum having a helical auger mounted therein, a downstream end of the helical auger has a combination of first and second superposed helical elements of opposite rotational direction, each compartment at the downstream end being defined between respective first and second helical elements, a first group of compartments located towards the upstream end having a first length and a second group of compartments located towards the downstream end having a second length, the first length being longer than the second length, and at least one oil jet located on the tank for causing turbulent flow in the reservoir of oil.

The present invention further provides a method of lipophilically conditioning potato slices, the method comprising the steps of:

(a) conveying the potato slices through a reservoir of oil contained in a tank, the potato slices being conveyed using an elongate conveyor defining therealong a plurality of compartments for containing respective groups of potato slices, wherein the conveyor comprises a rotating drum having a helical auger mounted therein, the auger defining successive compartments within the reservoir of oil, a downstream end of the helical auger having a combination of first and second superposed helical elements of opposite rotational direction, each compartment at the downstream end being defined between respective first and second helical elements, and wherein a first group of compartments located towards the upstream end has a first length and a second group of compartments located towards the downstream end has a second length, the first length being longer than the second length; and (b) injecting oil into the reservoir from at least one oil jet located on the tank, the injected oil causing turbulent flow in the reservoir of oil and agitation of the potato slices in the oil.

Preferred features are defined in the dependent claims.

The present inventors have found that the provision of the lipophilic conditioning apparatus and method, which may be carried out before a later step such as explosive dehydration in a microwave and so may be a pre-conditioning apparatus and method, provides very uniform slice treatment when treating potato slices for the manufacture of potato chips. The apparatus and process are scaleable, and can be employed for various mass flow rates of product therethrough. The method can provide a controlled compartmentalised plug flow which provides a very high tolerance residence time for the products in the oil and slice singulation. This ensures that each slice sees uniform and consistent processing conditions and thus receives the same product transformation during the lipophilic pre-conditioning. This in turn ensures that the resultant snack food product such as a potato chip, produced by the lipophilic pre-conditioning and subsequent microwave explosive dehydration steps discussed above, not only has low oil but also has, with a high level of product uniformity, the combination of flavour, organoleptic properties and shelf life in a non-fried potato chip which is equal or superior in consumer acceptance to conventional fried potato chips.

BRIEF DESCRIPTION OF THE DRAWINGS

An embodiment of the present invention will now be described, by way of example only, with reference to the accompanying drawings in which.

DETAILED DESCRIPTION OF THE INVENTION

Figure 1:
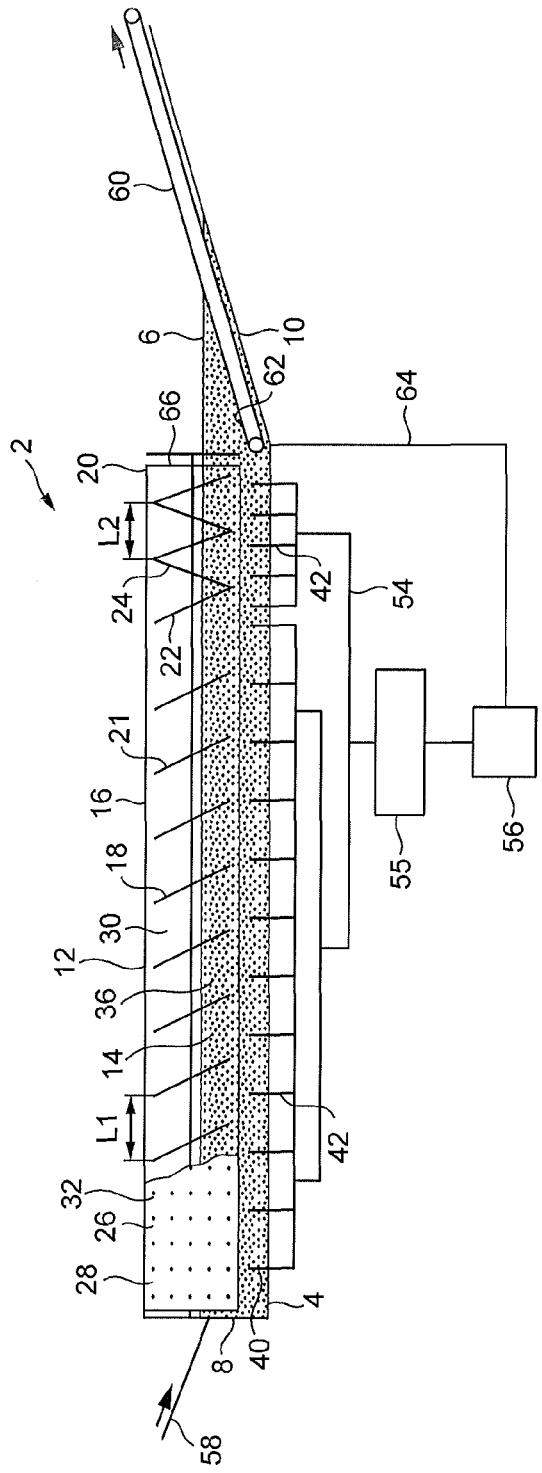
FIG. 1 is a schematic partly cut-away side view of an apparatus for lipophilically pre-conditioning potato slices, prior to microwave cooking, according to an embodiment of the present invention.
Figure 2:
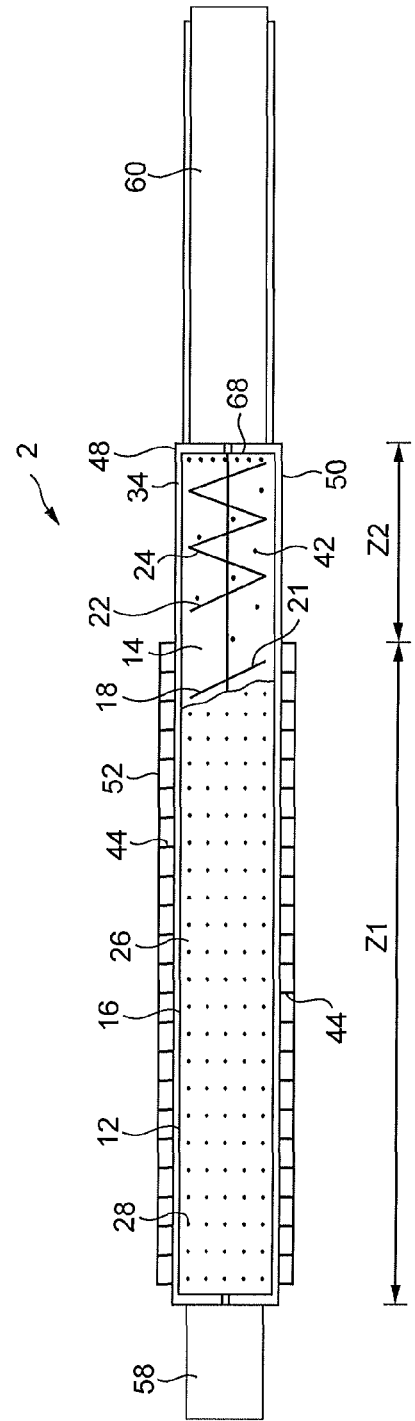
FIG. 2 is a schematic partly cut-away plan view of the apparatus of FIG. 1.

An embodiment of an apparatus for lipophilically pre-conditioning potato slices, prior to microwave cooking of the potato slices to form potato chips, according to one aspect of the present invention is illustrated in FIGS. 1 and 2.

Referring to the Figures, an apparatus, designated generally as 2, for lipophilically pre-conditioning potato slices comprises an elongate tank 4 for containing a reservoir 6 of oil. The tank 4 has an upstream end 8 and a downstream end 10. An elongate longitudinal conveyor 12 is disposed in the tank 4, the conveyor 12 being adapted to pass products, in particular potato slices, through the reservoir 6 of oil from the upstream end 8 to the downstream end 10. The conveyor 12 defines therealong a plurality of compartments 14 for containing respective groups of products during passage from the upstream end 8 to the downstream end 10.

The conveyor 12 comprises a rotatable cylindrical drum 16 having a helical auger 18 mounted therein. The rotational axis of the drum is typically slightly above the upper level of the oil reservoir 6. The drum 16 and the helical auger 18 are rotated continuously by a drive motor (not shown). In other embodiments of the invention, as an alternative conveyor to the use of an auger, other conveying mechanisms could be employed, such as a conveyor incorporating pockets or a paddle blancher, both known to those skilled in the art.

A downstream end 20 of the helical auger 18 has a combination of first and second superposed helical elements 22, 24 of opposite rotational direction, each compartment 14 at the downstream end 20 being defined between respective first and second helical elements 22, 24.

The longitudinal wall 26 of the drum 16 has a plurality of perforated holes 28 to permit oil to flow into and out of a central cavity 30 of the drum 16. The perforated holes 28 are regularly spaced along and around the drum 16. For at least an upstream portion 32 of the drum 16 the perforated holes 28 have a total surface area of from 25 to 60% of the area, optionally about 40% of the area, of the longitudinal wall 26 of the drum 16. For at least a downstream portion 34 of the drum 16 the perforated holes 28 have a total surface area of from 10 to 40% of the area, optionally about 25%, of the longitudinal wall 26 of the drum 16, which total surface area is lower than for the upstream portion 32 of the drum 16. The downstream portion 34 of the drum 16 has a length substantially corresponding to a length of a final compartment 14 of the conveyor 12. Typically, the perforated holes 28 have a width of from 2 to 10 mm, optionally 4 to 8 mm, further optionally about 6 mm.

A first group 36 of compartments 14 located towards the upstream end 8 has a first length L1 and a second group 38 of compartments 14 located towards the downstream end 10 has a second length L2, the first length L1 being longer than the second length L2. Typically, there are from ten to twenty compartments 14 in the first group 36, optionally fourteen compartments 14, and from two to five compartments 14, optionally three compartments 14, in the second group 38. Typically, the compartments 14 of first group 36 have a compartment length of from 150 to 400 mm, optionally 200 to 250 mm, further optionally about 230 mm. As mentioned above, the compartments 14 of the second group 38 are formed from two rotationally opposite helical screw elements 22, 24, having a compartment length of from 100 to 300 mm, optionally 125 to 175 mm, further optionally about 150 mm. The provision of helically opposite screw elements 22, 24 at the discharge end of the auger 18 provides a more even product flow, because there is a greater number of compartments 14 for any given conveyor length and because the product output is directed by the helical surfaces partly towards alternating lateral sides of the end of the auger 18.

At least one oil jet 40 is located on the tank 4 for causing turbulent flow in the reservoir 6 of oil. An oil circulation system 49 communicates between the tank 4 and the at least one oil jet 40 to provide oil to the at least one oil jet 40 from a bottom portion of the tank 4.

In the embodiment, a plurality of the oil jets 40 are located along at least a majority of the length of the tank 4. A first group 42 of oil jets 40 is located on a bottom 44 of the tank 4 and direct oil upwardly towards the drum 16 and a second group 46 of oil jets 40 is located on at least one side 48, 50 of the tank 4 and direct oil laterally towards the drum 16. Typically, the first group 42 of oil jets 40 are oriented perpendicular to the drum rotation and direct turbulent oil vertically upwardly.

The tank 4 comprises at least two zones, Z1, Z2 successively located therealong, each zone Z1, Z2 having a respective jet configuration.

A first zone Z1 extends along a major portion of the tank 4 and comprises upwardly directed oil jets 42 and laterally directed oil jets 44. In the first zone Z1 the upwardly directed oil jets 42 are mutually spaced along the length of the tank 4, for example by a distance of from 75 to 250 mm, optionally 125 to 175 mm, further optionally about 150 mm, to provide a continuous agitation of oil along the length of the first zone Z1. In the first zone Z1 the upwardly directed oil jets 42 may additionally be mutually spaced across the width of the bottom of the tank 4 to provide a continuous agitation of oil across the width of the first zone Z1. In the first zone Z1 the upwardly directed oil jets 42 are connected to an oil supply system 54 adapted to pump oil out of the upwardly directed oil jets 42. In the first zone Z1 the upwardly directed oil jets 42 are adapted to direct oil into the tank 4 at a common velocity, optionally the velocity being from 5 to 15 meters/second. The upwardly directed oil jets 42 typically have a nozzle diameter of about 7.5 mm.

In the first zone Z1 the laterally directed oil jets 44 are mutually spaced along the length of the tank 4 on opposite sides 48, 50 of the tank 4. In the first zone Z1 the laterally directed oil jets 44 are mutually spaced along the length by a distance of from 20 to 50 mm, optionally 25 to 45 mm, and are spaced from the conveyor 12 by a distance of from 10 to 50 mm, optionally 20 to 30 mm, further optionally about 25 mm. In the first zone Z1 the laterally directed oil jets 44 are connected to an oil supply system 52 adapted to pump oil out of the laterally directed oil jets 44 at an exit velocity of from 5 to 20 meters/second, optionally from 10 to 15 meters/second. The laterally directed jets 44 typically have a nozzle diameter of about 3 mm.

The oil supply systems 52, 54 include at least one pump 56 for providing pressurised oil to the oil jets 42, 44 and a heater 55 for heating the oil to the desired lipophilic treatment temperature. The oil pressure is typically from $1 \times 10^{-3}$ to $10 \times 10^{-3}$ N/m$^2$, optionally about $5 \times 10^{-3}$ N/m$^2$ (about 35 psi). The oil temperature is typically maintained at 90° C.+/−2° C. If desired, oil clean-up may be provided by, for example, a water recovery device and/or a filter.

In the second zone Z2 the upwardly directed oil jets 42 are formed as plural lines of oil jets 42, the lines being mutually spaced in a direction across the width of the tank 4 and the oil jets 42 of each line being mutually spaced in a direction along the length of the tank 4. Typically, in the second zone Z2 the upwardly directed oil jets 42 are mutually spaced along the length by a distance of from 75 to 250 mm, optionally 125 to 175 mm, further optionally about 150 mm, and mutually spaced across the width of the bottom of the tank 4 by a distance of from 25 to 150 mm, optionally 50 to 100 mm, further optionally about 75 mm.

In the second zone Z2 at least some of the upwardly directed oil jets 42 are located at a downstream end of the conveyor 4.

A weir 58 is located at the upstream end 8 of the tank 4 for inputting products, such as potato slices, in a flow of oil into the tank 4. The oil flow in the weir 58 is selected so as to be sufficient to prevent slices from sticking to walls and other surfaces of the weir 58.

An output belt conveyor 60, comprising an oil-permeable belt, for example of metal mesh, is located at the downstream end 10 of the tank 4 for outputting oil-conditioned products, such as potato slices, from the tank 4. The upstream end 62 of the output belt conveyor 60 is submerged within the reservoir 6 of oil. The downstream end 20 of the rotating helical auger 18 urges products from the end compartment 14 at the downstream end 20 onto the output belt conveyor 60. The output belt conveyor 60 is inclined upwardly out of the tank 4. As the products exit the reservoir 6 of oil, excess oil can drip back down into the tank or an adjacent oil recovery device 64 through the oil-permeable belt. The output belt conveyor 60 delivers the oil-conditioned products to a subsequent processing apparatus, such as an oil-removal device prior to downstream microwave cooking of the potato slices, as described hereinbefore.

The circulating oil flow includes three controllable circuits. These circuits are controllable via a control valve, such as a manual notch ball valve or a gate valve.

A first circuit includes the bottom jets 42 along the majority of the length of the drum 16, which are coupled to a control valve, and the side jets 44 along the majority of the length of the drum 16, which are not coupled to a control valve so the side jets 44 are always fully open. The bottom and side jets 42, 44 introduce turbulent flow of the oil which keeps the slices in motion and separated while they travel through the drum 16. The oil flow from the side jets 44 also serves to remove slices that may be stuck on the inside of the rotating drum 16. The side jets 44 are evenly spaced along the majority of the length of the drum and are located below the oil level in the tank 4. The side jets 42 have an exit velocity and are oriented so that the exiting turbulent oil does not break the oil surface in the tank 4 and thereby increase air entrainment.

A second circuit is at the discharge downstream end 20 of the helical auger 18. There are three longitudinally oriented rows of bottom jets 42 pointing upwardly towards the drum 16, and at least some of these bottom jets 42 are inclined forwardly at an angle to the vertical, so as to assist directing the endmost slices onto the output belt conveyor 60. These rows are staggered to provide an array of closely spaced jets 42 to spread the agitation along the transverse width of this final section prior to exiting the drum 16. The closely spaced jets 42 are typically spaced 75 mm (3 inches) apart width-wise and 150 mm (6 inches) apart length-wise. There is also a single row of transversely oriented bottom jets 42 pointed along a back plate 66 of the drum 16 to keep the turbulent oil flow energized on the back plate 66, with these bottom jets being optionally inclined forwardly at an acute angle to the vertical so as to be oriented towards the back plate 66. These two flows have separate valve adjustment. The slices are agitated by the turbulent oil and forced by the oil flow forwardly out of the drum 16 and onto the output belt conveyor 60.

A third circuit comprises the oil flow over the weir 58. All or part of this flow may be independently captured and recirculated.

In the method of lipophilically pre-conditioning potato slices, according to the embodiment of the present invention, the potato slices are conveyed through the reservoir 6 of oil contained in the tank 4. The potato slices are conveyed using the rotating helical auger 18 which constitutes an elongate conveyor defining therealong a plurality of compartments 14 for containing respective groups of potato slices. Oil is injected into the reservoir 6 from the at least one oil jet 42, 44 located on the tank 4. The injected oil causes turbulent flow in the reservoir 6 of oil and agitation of the potato slices in the oil.

The potato slices 6 typically have a thickness of 1 to 2.5 mm, more typically about 1.3 mm (51 thousandths of an inch). The input potato slices are typically washed potato slices, with 7 to 10 wt % free surface water. The rotating helical auger 18 is able to convey single slices even though there may be a degree of overlap of slices or clumping in the product input. This is because the slices are dropped into the oil at the upstream end and then singulate, i.e. the clumps and overlaps are removed by separation of the slices into single slices, under the agitating action of the turbulent oil and by movement of the auger.

The provision of controlled plug flow of the products through the reservoir 6 of oil by provision of the constant velocity translating compartments 14 provides that the residence time of each slice in the reservoir 6 of oil is highly uniform. Each slice is resident in the oil for a predetermined period, typically 90 seconds. The compartmental conveyor mechanism ensures that the slices have a total residence time of 90 seconds with a tolerance of +/−5 seconds. This control of temperature and residence time, in combination with the slice separation and agitation provides that each slice is exposed equally to the lipophilic pre-conditioning process. The slices remain submerged in the oil between the upstream end 8 and downstream end 10 of the tank 4. The oil circulation system 49 and the associated jets 42, 44 act in conjunction with rotating helical auger 18 to agitate the slices in the oil.

The slices are fully contained in the compartments throughout the lipophilic pre-conditioning process, resulting in a well-defined lipophilic pre-conditioning residence time with minimal damage to, or loss of, slices. Turbulence is used inside the lipophilic pre-conditioning apparatus to separate the slices, allowing for sufficient enzyme deactivation and slice separation at the downstream output end.

The potato slices are pre-treated in oil in the lipophilic preconditioning process and thereafter have about 30 wt % surface oil, based on the dry weight of the final potato chip produced from the potato slice. In this specification the "dry weight of the final potato chip" assumes 2 wt % water content in the total weight of the final cooked and dried potato chip, prior to final seasoning of the potato chip. The oil typically comprises a vegetable oil such as sunflower oil, conventionally used for manufacturing potato chips. After the lipophilic preconditioning process, excess oil is removed in a de-oiling step, and thereafter the potato slices are subject to a drying and cooking process using microwave radiation, the cooking process using explosive dehydration of the potato slices. The oil is employed in the lipophilic preconditioning to provide the required organoleptic properties to the resultant potato chip, which has been cooked by the combination of the preliminary oil treating step and a subsequent microwave cooking step, and has not been fried, as for a conventional potato chip.

Various other modifications to the illustrated embodiment will be apparent to those skilled in the art.

The invention claimed is:

1. An apparatus for lipophilically conditioning potato slices, the apparatus comprising an elongate tank for containing a reservoir of oil, the tank having an upstream end and a downstream end, an elongate longitudinal conveyor disposed in the tank, the conveyor being adapted to pass products through the reservoir of oil from the upstream end to the downstream end, the conveyor defining therealong a plurality of compartments for containing respective groups of products during passage from the upstream end to the downstream end, wherein the conveyor comprises a rotatable drum having a helical auger mounted therein, a downstream end of the helical auger has a combination of first and second superposed helical elements of opposite rotational direction, each compartment at the downstream end being defined between respective first and second helical elements, a first group of compartments located towards the upstream end having a first length and a second group of compartments located towards the downstream end having a second length, the first length being longer than the second length, and at least one oil jet located on the tank for causing turbulent flow in the reservoir of oil.

2. An apparatus according to claim 1, wherein the longitudinal wall of the drum has a plurality of perforated holes to permit oil to flow into and out of a central cavity of the drum.

3. An apparatus according to claim 2, wherein the perforated holes are regularly spaced along and around the drum.

4. An apparatus according to claim 2, wherein for at least an upstream portion of the drum the perforated holes have a total surface area of from 25 to 60% of the area of the longitudinal wall of the drum.

5. An apparatus according to claim 4, wherein for at least a downstream portion of the drum the perforated holes have a total surface area of from 10 to 40% of the area of the longitudinal wall of the drum, which total surface area is lower than for the upstream portion of the drum.

6. An apparatus according to claim 5, wherein the downstream portion of the drum has a length substantially corresponding to a length of a final compartment of the conveyor.

7. An apparatus according to claim 2, wherein the perforated holes have a width of from 2 to 10 mm.

8. An apparatus according to claim 1, wherein there are from ten to twenty compartments in the first group and from two to five compartments in the second group.

9. An apparatus according to claim 1, wherein the compartments of the first group have a length of from 150 to 400 mm and the compartments of the second group are formed from two rotationally opposite helical screws, having a compartment length of from 100 to 300 mm.

10. An apparatus according to claim 1, wherein the at least one oil jet comprises a plurality of oil jets located along at least a majority of the length of the tank.

11. An apparatus according to claim 10, wherein a first group of oil jets is located at a bottom of the tank and direct oil upwardly towards the drum and a second group of oil jets is located at at least one side of the tank and direct oil laterally towards the drum.

12. An apparatus according to claim 11, wherein the tank comprises at least two zones successively located therealong, each zone having a respective jet configuration.

13. An apparatus according to claim 12, wherein a first zone extends along a major portion of the tank and comprises oil jets of the first group and the second group.

14. An apparatus according to claim 13, wherein in the first zone the oil jets of the first group are mutually spaced along the length of the tank to provide a continuous agitation of oil along the length of the first zone.

15. An apparatus according to claim 14, wherein in the first zone the oil jets of the first group are mutually spaced along the length by a distance of from 75 to 250 mm.

16. An apparatus according to claim 13, wherein in the first zone the oil jets of the first group are mutually spaced across the width of the bottom of the tank to provide a continuous agitation of oil across the width of the first zone.

17. An apparatus according to claim 13, wherein in the first zone the oil jets of the first group are adapted to direct oil into the tank at a common velocity of from 5 to 15 meters/second.

18. An apparatus according to claim 13, wherein in the first zone the oil jets of the second group are mutually spaced along the length of the tank on opposite sides of the tank.

19. An apparatus according to claim 18 wherein in the first zone the oil jets of the second group are mutually spaced along the length by a distance of from 20 to 50 mm.

20. An apparatus according to claim 18, wherein in the first zone the oil jets of the second group are spaced from the conveyor by a distance of from 10 to 50 mm.

21. An apparatus according to claim 18, wherein in the first zone the oil jets of the second group are located in a lower portion of the tank.

22. An apparatus according to claim 18, wherein in the first zone the oil jets of the second group are connected to an oil supply system adapted to pump oil out of the oil jets of the second group at an exit velocity of from 5 to 20 meters/second.

23. An apparatus according to claim 13, wherein in a second zone downstream of the first zone the oil jets of the first group are formed as plural lines of oil jets, the lines being mutually spaced in a direction across the width of the tank and the oil jets of each line being mutually spaced in a direction along the length of the tank.

24. An apparatus according to claim 23, wherein in the second zone the oil jets of the first group are mutually spaced along the length by a distance of from 75 to 250 mm.

25. An apparatus according to claim 23, wherein in the second zone at least some of the oil jets of the first group are located downstream of the conveyor.

26. An apparatus according to claim 23, further comprising at least one pump for providing pressurised oil to the at least one jet, the at least one pump being adapted to provide an oil pressure of from $1 \times 10^{-3}$ to $10 \times 10^{-3}$ N/m$^2$.

27. An apparatus according to claim 23, further comprising a weir at the upstream end of the tank for inputting products in a flow of oil into the tank.

28. An apparatus according to claim 23, further comprising an output belt conveyor at the downstream end of the tank for outputting products from the tank.

29. An apparatus according to claim 28, wherein the output belt conveyor comprises an oil-permeable belt.

30. An apparatus according to claim 13, wherein in the second zone the oil jets of the first group are mutually spaced across the width of the bottom of the tank by a distance of from 25 to 150 mm.

31. A method of lipophilically conditioning potato slices, the method comprising the steps of;
(a) conveying the potato slices through a reservoir of oil contained in a tank, the potato slices being conveyed using an elongate conveyor defining therealong a plurality of compartments for containing respective groups of potato slices, wherein the conveyor comprises a rotating drum having a helical auger mounted therein, the auger defining successive compartments within the reservoir of oil, a downstream end of the helical auger having a combination of first and second superposed helical elements of opposite rotational direction, each compartment at the downstream end being defined between respective first and second helical elements, and wherein a first group of compartments located towards the upstream end has a first length and a second group of compartments located towards the downstream end has a second length, the first length being longer than the second length; and
(b) injecting oil into the reservoir from at least one oil jet located on the tank, the injected oil causing turbulent flow in the reservoir of oil and agitation of the potato slices in the oil.

32. A method according to claim 31, wherein the longitudinal wall of the drum has a plurality of perforated holes, and oil flows into and out of a central cavity of the drum.

33. A method according to claim 32, wherein the perforated holes are regularly spaced along and around the drum.

34. A method according to claim 32, wherein for at least an upstream portion of the drum the perforated holes have a total surface area of from 25 to 60% of the area of the longitudinal wall of the drum.

35. A method according to claim 34, wherein for at least a downstream portion of the drum the perforated holes have a total surface area of from 10 to 40% of the area of the longitudinal wall of the drum, which total surface area is lower than for the upstream portion of the drum.

36. A method according to claim 35, wherein the downstream portion of the drum has a length substantially corresponding to a length of a final compartment of the conveyor.

37. A method according to claim 31, wherein there are from ten to twenty compartments in the first group and from two to five compartments in the second group.

38. A method according to claim 31, wherein the at least one oil jet comprises a plurality of oil jets located along at least a majority of the length of the tank.

39. A method according to claim 38, wherein a first group of oil jets is located at a bottom of the tank and direct oil upwardly towards the drum and a second group of oil jets is located at at least one side of the tank and direct oil laterally towards the drum.

40. A method according to claim 39, wherein the tank comprises at least two zones successively located therealong, each zone having a respective jet configuration.

41. A method according to claim 40, wherein a first zone extends along a major portion of the tank and comprises oil jets of the first group and the second group.

42. A method according to claim 41, wherein in the first zone the oil jets of the first group are mutually spaced along the length of the tank to provide a continuous agitation of oil along the length of the first zone.

43. A method according to claim 42, wherein in the first zone the oil jets of the first group are mutually spaced across the width of the bottom of the tank to provide a continuous agitation of oil across the width of the first zone.

44. A method according to claim 41, wherein in the first zone the oil jets of the first group direct oil into the tank at a common velocity of from 5 to 15 meters/second.

45. A method according to claim 41, wherein in the first zone the oil jets of the second group are mutually spaced along the length of the tank on opposite sides of the tank.

46. A method according to claim 45, wherein in the first zone the oil jets of the second group are spaced from the conveyor by a distance of from 10 to 50 mm.

47. A method according to claim 41, wherein in the first zone the oil jets of the second group are located in a lower portion of the tank and direct oil into the reservoir.

48. A method according to claim 41, wherein in the first zone the oil jets of the second group are connected to an oil supply system which pumps oil out of the oil jets of the second group at an exit velocity of from 5 to 20 meters/second.

49. A method according to claim 41, wherein in a second zone downstream of the first zone the oil jets of the first group are formed as plural lines of oil jets, the lines being mutually spaced in a direction across the width of the tank and the oil jets of each line being mutually spaced in a direction along the length of the tank.

50. A method according to claim 49, wherein in the second zone at least some of the oil jets of the first group are located at a downstream end of the conveyor.

51. A method according to claim 31, wherein an oil flow through the at least one jet has an oil pressure of from $1 \times 10^{-3}$ to $10 \times 10^{-3}$ N/m².

52. A method according to claim 31, wherein at an upstream end of the tank potato slices in a flow of oil are inputted into the tank over a weir.

53. A method according to claim 31, wherein at a downstream end of the tank potato slices outputting products from the tank on an output belt conveyor having an upstream end submerged in the reservoir of oil.

54. A method according to claim 53, wherein the output belt conveyor comprises an oil-permeable belt.

* * * * *